US009638536B2

United States Patent
Ono

(10) Patent No.: US 9,638,536 B2
(45) Date of Patent: May 2, 2017

(54) NAVIGATION DEVICE, ROUTE GUIDANCE CONTROL METHOD IN NAVIGATION DEVICE, AND NON-TRANSITORY COMPUTER-READABLE STORAGE MEDIUM STORING PROGRAM

(71) Applicant: ALPINE ELECTRONICS, INC., Shinagawa-ku, Tokyo (JP)

(72) Inventor: Tatsuya Ono, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 112 days.

(21) Appl. No.: 14/680,202

(22) Filed: Apr. 7, 2015

(65) Prior Publication Data

US 2015/0330802 A1 Nov. 19, 2015

(30) Foreign Application Priority Data

May 19, 2014 (JP) ................................ 2014-103190

(51) Int. Cl.
  *G01C 21/36* (2006.01)
  *B60W 50/14* (2012.01)
  *B60K 35/00* (2006.01)
  *G05D 1/00* (2006.01)

(52) U.S. Cl.
  CPC .......... *G01C 21/3626* (2013.01); *B60K 35/00* (2013.01); *B60W 50/14* (2013.01); *G05D 1/0061* (2013.01); *G01C 21/3629* (2013.01); *G05D 2201/0213* (2013.01)

(58) Field of Classification Search
  CPC ................. B60W 50/14; G05D 1/0061; G05D 2201/0213
  See application file for complete search history.

(56) References Cited

U.S. PATENT DOCUMENTS

| 5,343,399 | A  | * | 8/1994  | Yokoyama ......... G01C 21/3629 340/990 |
| 8,260,482 | B1 | * | 9/2012  | Szybalski .............. B62D 1/286 701/23 |
| 9,216,746 | B2 | * | 12/2015 | Ham ...................... G01C 21/28 |
| 9,230,556 | B2 | * | 1/2016  | van Os ................... G10L 21/00 |

(Continued)

FOREIGN PATENT DOCUMENTS

| DE | 10123482 | 11/2002 |
| EP | 1308812  | 5/2003  |

(Continued)

OTHER PUBLICATIONS

Extended European Search Report and Official Communication for EPO15163213.0 dated Oct. 12, 2015, 9 pgs.

*Primary Examiner* — Todd Melton
(74) *Attorney, Agent, or Firm* — Brinks Gilson & Lione

(57) ABSTRACT

A navigation device mounted in a vehicle travelling in any driving mode out of an automatic driving mode for travelling irrespective of a driver's driving operations and a normal driving mode for travelling according to the driver's driving operations includes a driving mode determination unit for determining whether a driving mode of the vehicle is the automatic driving mode or the normal driving mode, and a route guidance stop control unit for, when the driving mode determination unit determines that a driving mode of the vehicle is the automatic driving mode, stopping route guidance made while the vehicle is travelling in the normal driving mode.

20 Claims, 6 Drawing Sheets

(56) References Cited

U.S. PATENT DOCUMENTS

| | | |
|---|---|---|
| 2003/0088344 A1 | 5/2003 | Oda et al. |
| 2004/0068366 A1 | 4/2004 | Nisiyama |
| 2010/0286862 A1 | 11/2010 | Fox et al. |
| 2010/0324818 A1* | 12/2010 | Gellatly ............ G01C 21/3641 701/431 |
| 2013/0322665 A1* | 12/2013 | Bennett ............ G08G 1/096855 381/300 |

FOREIGN PATENT DOCUMENTS

| | | |
|---|---|---|
| JP | 2004-125726 | 4/2004 |
| WO | WO2015/049231 | 4/2015 |

\* cited by examiner

NAVIGATION DEVICE, ROUTE GUIDANCE CONTROL METHOD IN NAVIGATION DEVICE, AND NON-TRANSITORY COMPUTER-READABLE STORAGE MEDIUM STORING PROGRAM

RELATED APPLICATION

The present application claims priority to Japanese Patent Application Number 2014-103190, filed May 19, 2014, the entirety of which is hereby incorporated by reference.

BACKGROUND

1. Field of the Invention

The present disclosure relates to a navigation device mounted in a vehicle which travels in any driving mode out of an automatic driving mode for travelling irrespective of a driver's driving operations and a normal driving mode for travelling according to the driver's driving operations, a route guidance control method in the navigation device, and a non-transitory computer-readable storage medium storing therein a program for causing a computer to perform processing in the navigation device.

2. Description of the Related Art

In recent years, there has been an enhanced automatic driving technique for causing a vehicle to travel irrespective of driver's driving operations by controlling the steering wheel, the accelerator and the brake while sensing a situation surrounding the vehicle based on video acquired from a plurality of cameras, for example. In such a situation, there is proposed a navigation device mounted in a vehicle which travels in any driving mode out of an automatic driving mode for travelling irrespective of a driver's driving operations and a normal driving mode for travelling according to the driver's driving operations (see JP 2004-125726 A). With the navigation device, when a plurality of route candidates exist between two locations or between the current location and the destination location, a route including a road along which the vehicle can automatically travel is preferentially selected. With such a navigation device, a road along which the vehicle can automatically travel without the need of the driver's driving operations is easily included in the route along which the vehicle is to be guided, thereby alleviating the load on the driver due to driving operations.

With the navigation device, however, when the vehicle travels in the automatic driving mode along a road capable of automatic driving without the need of route guidance, an audio guidance for route guidance or guidance display such as travelling lane designation, right- or left-turn designation, or straight designation is made, and thus audio output for such a route guidance or guidance display output is troublesome for the driver. In particular, if audio output for route guidance or guidance display output interrupts while music contents or video contents are being output in the vehicle travelling in the automatic driving mode, the music contents or video contents are difficult to listen to or view, and the passengers may feel uncomfortable.

SUMMARY

The present disclosure is directed to provide a navigation device which does not output a route guidance while a vehicle is travelling in an automatic driving mode. The present disclosure is further directed to provide a route guidance control method in such a navigation device, and a program for causing a computer to perform processing in the navigation device.

A navigation device according to the present disclosure is mounted in a vehicle travelling in any driving mode out of an automatic driving mode for travelling irrespective of a driver's driving operations and a normal driving mode for travelling according to the driver's driving operations, and includes a driving mode determination unit configured to determine whether a driving mode of the vehicle is the automatic driving mode or the normal driving mode, and a route guidance stop control unit configured to, when the driving mode determination unit determines that a driving mode of the vehicle is the automatic driving mode, stop a route guidance made while the vehicle is travelling in the normal driving mode. With the structure, when a driving mode of the vehicle is determined as the automatic driving mode, a route guidance made while the vehicle is driving in the normal driving mode for travelling according to driver's driving operations is stopped.

In the navigation device according to the present disclosure, the route guidance stop control unit includes an audio stop control unit configured to stop outputting an audio guidance for route guidance made while the vehicle is travelling in the normal driving mode from an audio output unit. With the structure, when a driving mode of the vehicle is determined as the automatic driving mode, an audio guidance for route guidance made while the vehicle is travelling in the normal driving mode for travelling according to the driver's driving operations stops being output from the audio output unit.

In the navigation device according to the present disclosure, the audio stop control unit includes an audio output determination unit configured to determine whether audio other than the voice for route guidance is output from the audio output unit, and can stop interrupting and outputting the audio guidance from the audio output unit when the audio output determination unit determines that audio other than the voice for route guidance is output from the audio output unit. With the structure, when the vehicle driving mode is determined as the automatic driving mode while audio other than the voice for route guidance, such as audio for audio contents, is output from the audio output unit, the audio guidance for route guidance made while the vehicle is travelling in the normal driving mode for travelling according to the driver's driving operations stops interrupting and being output from the audio output unit.

In the navigation device according to the present disclosure, the route guidance stop control unit may include a display stop control unit configured to stop the guidance display for route guidance made on the display unit while the vehicle is travelling in the normal driving mode. With the structure, when the vehicle driving mode is determined as the automatic driving mode, the guidance display for route guidance made on the display unit while the vehicle is travelling in the normal driving mode for travelling according to the driver's driving operations is stopped.

In the navigation device according to the present disclosure, the display stop control unit includes a display output determination unit configured to determine whether video contents other than the guidance display for route guidance are displayed on the display unit, and can stop interrupting and outputting the guidance display on the display unit when the display output determination unit determines that the video contents are being displayed on the display unit. With the structure, while video contents other than the guidance display for route guidance are displayed on the display unit, when a driving mode of the vehicle is determined as the automatic driving mode, the guidance display for route guidance made on the display unit while the vehicle is travelling in the normal driving mode for travelling according to the driver's driving operations stops interrupting and being displayed.

The navigation device according to the present disclosure includes a driving mode switching detection unit configured to detect that the driving mode is switched from the automatic driving mode to the normal driving mode, and an on-switching route guidance control unit configured to, when the driving mode switching detection unit detects that the driving mode is switched from the automatic driving mode to the normal driving mode, make a route guidance based on a travelling state of the vehicle on detection of the driving mode switching. With the structure, when the vehicle driving mode is switched from the automatic driving mode for travelling irrespective of a driver's driving operations to the normal driving mode for travelling according to the driver's driving operations, route guidance is made based on the travelling state of the vehicle when the driving mode is switched. Thereby, the driver can perform a vehicle driving operation according to the route guidance based on the travelling state of the vehicle when the driving mode is switched to the normal driving mode.

In the navigation device according to the present disclosure, the on-switching route guidance control unit may output an audio guidance for route guidance based on the travelling state of the vehicle on detection of the driving mode switching from the audio output unit. With the structure, when the vehicle driving mode is switched from the automatic driving mode for travelling irrespective of a driver's driving operations to the normal driving mode for travelling according to the driver's driving operations, an audio guidance for route guidance based on the travelling state of the vehicle when the driving mode is switched is output from the audio output unit. Thereby, the driver performs a vehicle driving operation while listening to the audio guidance for route guidance based on the travelling state of the vehicle when the driving mode is switched to the normal driving mode.

In the navigation device according to the present disclosure, the on-switching route guidance control unit can perform guidance display for route guidance based on the travelling state of the vehicle on detection of the driving mode switching on the display unit. With the structure, when the vehicle driving mode is switched from the automatic driving mode for travelling irrespective of a driver's driving operations to the normal driving mode for travelling according to the driver's driving operations, the guidance display for route guidance based on the travelling state of the vehicle when the driving mode is switched is made on the display unit. Thereby, the driver can perform a vehicle driving operation while viewing the guidance display for route guidance based on the travelling state of the vehicle when the driving mode is switched to the normal driving mode.

A route guidance control method according to the present disclosure is performed in a navigation device mounted in a vehicle travelling in any driving mode out of an automatic driving mode for travelling irrespective of a driver's driving operations and a normal driving mode for traveling according to the driver's driving operations, and includes a driving mode determination process of determining whether a driving mode of the vehicle is the automatic driving mode or the normal driving mode, and a route guidance stop control process of, when a driving mode of the vehicle is determined as the automatic driving mode in the driving mode determination process, stopping a route guidance made while the vehicle is travelling in the normal driving mode.

A non-transitory computer-readable storage medium storing a program according to the present disclosure is directed for causing a computer to perform processing in a navigation device mounted in a vehicle travelling in any driving mode out of an automatic driving mode for travelling irrespective of a driver's driving operations and a normal driving mode for travelling according to the driver's driving operations, the program causing the computer to perform a driving mode determination process of determining whether a driving mode of the vehicle is the automatic driving mode or the normal driving mode, and a route guidance stop control process of, when a driving mode of the vehicle is determined as the automatic driving mode in the driving mode determination process, stopping a route guidance made while the vehicle is travelling in the normal driving mode.

According to the navigation device, the route guidance control method in the navigation device, and the program for causing a computer to perform processing in the navigation device, when the vehicle driving mode is determined as the automatic driving mode, a route guidance made while the vehicle is travelling in the normal driving mode for travelling according to a driver's driving operations is stopped, and thus the route guidance is not output while the vehicle is travelling in the automatic driving mode. Thus, when the vehicle travels in the automatic driving mode along the road capable of automatic driving without the need of a route guidance, the driver does not feel uncomfortable due to route guidance such as travelling lane designation, right- or left-turn designation, and straight designation.

DETAILED DESCRIPTION

An embodiment according to the present disclosure will be described below with reference to the drawings.

Figure 1:
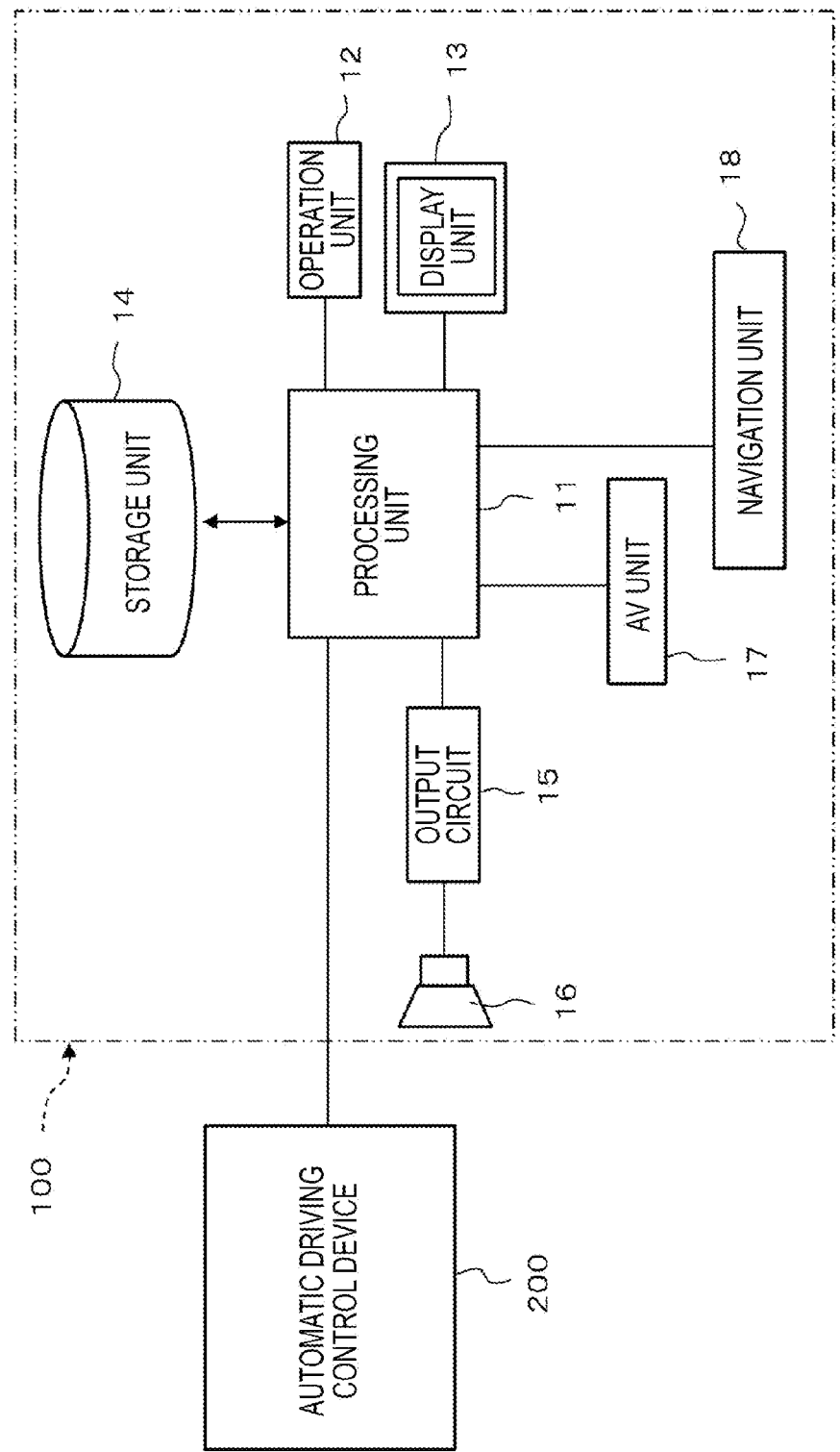
FIG. 1 is a block diagram illustrating a structure of vehicle-mounted equipment including a navigation device according to an embodiment of the present invention.

Vehicle-mounted equipment including a navigation device according to one embodiment of the present disclosure is configured as illustrated in FIG. 1. Vehicle-mounted equipment 100 is configured of computer units (including CPU), and includes a processing unit 11 for performing various processing according to a program. The processing unit 11 is connected with an AV unit 17 for reproducing various sound sources and video sources (such as CD or DVD) and a navigation unit 18 for performing navigation processing such as vehicle route guidance. The processing unit 11 is connected with an output circuit 15 connected with a speaker 16. Audio signals from the AV unit 17 and the navigation unit 18 are supplied to the speaker 16 via the output circuit 15, and audio based on the audio signals is output from the speaker 16 under control of the processing unit 11. The processing unit 11 is further connected with a storage unit 14 (such as hard disk drive) for storing therein various items of information such as audio information or video information reproduced in the AV unit 17, or map information used for the processing in the navigation unit 18.

The vehicle-mounted equipment 100 includes a display unit 13 configured of a LCD panel and provided on an instrument panel or the like inside the vehicle, and an operation unit 12 configured of a touch panel or the like integrally provided on the display unit 13 (e.g., LCD panel). The processing unit 11 can perform various processing based on input information in response to an operation of the operation unit 12, and can display information such as images acquired by various processing on the display unit 13.

In the vehicle-mounted equipment 100, the navigation device according to one embodiment of the present disclosure is configured by the functions of the navigation unit 18 and the processing unit 11.

A vehicle containing the vehicle-mounted equipment 100 includes an automatic driving control device 200 for controlling the operations of the steering wheel, the accelerator and the brake while sensing a situation surrounding the vehicle based on videos acquired from a plurality of cameras, for example. The automatic driving control device 200 controls the operations of the steering wheel, the accelerator and the brake thereby to realize travelling in an automatic driving mode irrespective of a driver's driving operations. The automatic driving control device 200 provides, to the processing unit 11 in the vehicle-mounted equipment 100, a status signal indicating any state out of an enabled operation state or an automatic driving mode state, and a disabled operation state or a normal driving mode state in which the vehicle travels according to the driver's driving operations. The processing unit 11 can determine whether the vehicle driving mode is the automatic driving mode or the normal driving mode based on the status signal from the automatic driving control device 200.

Figure 2:
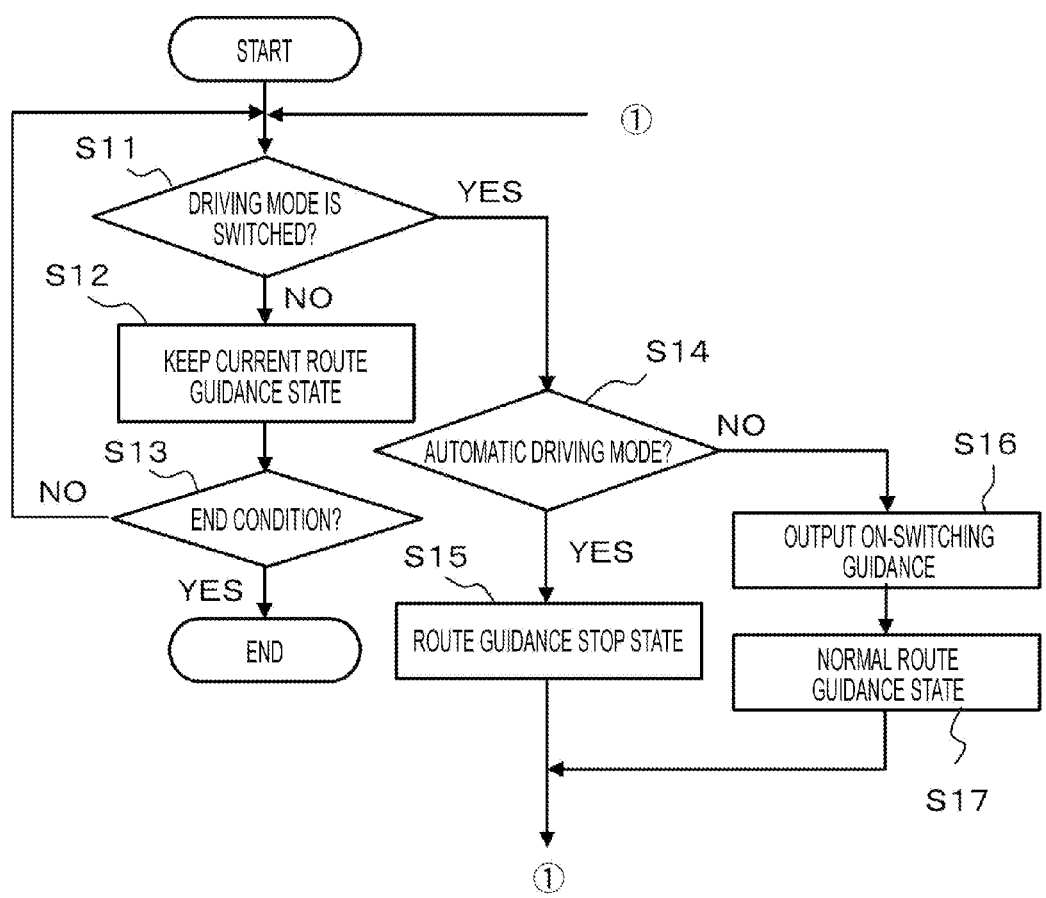
FIG. 2 is a flowchart illustrating an exemplary flow of processing for controlling the presence of an output route guidance based on the navigation processing.

The processing unit 11 controls whether to output route guidance based on the navigation processing by the navigation unit 18 according to the procedure indicated in FIG. 2. In FIG. 2, the processing unit 11 determines whether the driving mode is switched (switched from the automatic driving mode to the normal driving mode or switched from the normal driving mode to the automatic driving mode) based on the status signal from the automatic driving control device 200 (S11). When the driving mode is not switched (NO in S11), the processing unit 11 keeps the current route guidance state (S12). For example, when the vehicle driving mode is not switched and is kept in the normal driving mode, the state in which route guidance is made based on the navigation processing down to the destination location by the navigation unit 18 is kept. In this state, an audio guidance for route guidance such as travelling lane designation, right- or left-turn designation or straight designation is output from the speaker 16 and a guidance corresponding to each designation is displayed on the display unit 13.

When the driving mode is not switched (NO in S11), the processing unit 11 judges that a predetermined end condition such as a condition that the route guidance end operation is performed or a condition that the vehicle arrives at the designation location is not met (NO in S13), and keeps the current route guidance state (S12). In the processing, when the driving mode is switched (YES in S11), the processing unit 11 determines whether the switched driving mode is the automatic driving mode (S14: driving mode determination unit). When the switched driving mode is the automatic driving mode (YES in S14), the processing unit 11 stops the route guidance based on the navigation processing by the navigation unit 18 (S15: route guidance stop control unit). Thereafter, the processing unit 11 judges that the end condition is not met (NO in S13) until the driving mode is switched from the automatic driving mode to the normal driving mode (NO in S11), and keeps the current route guidance state or a state in which the route guidance is stopped in the automatic driving mode (S12).

Figure 3:
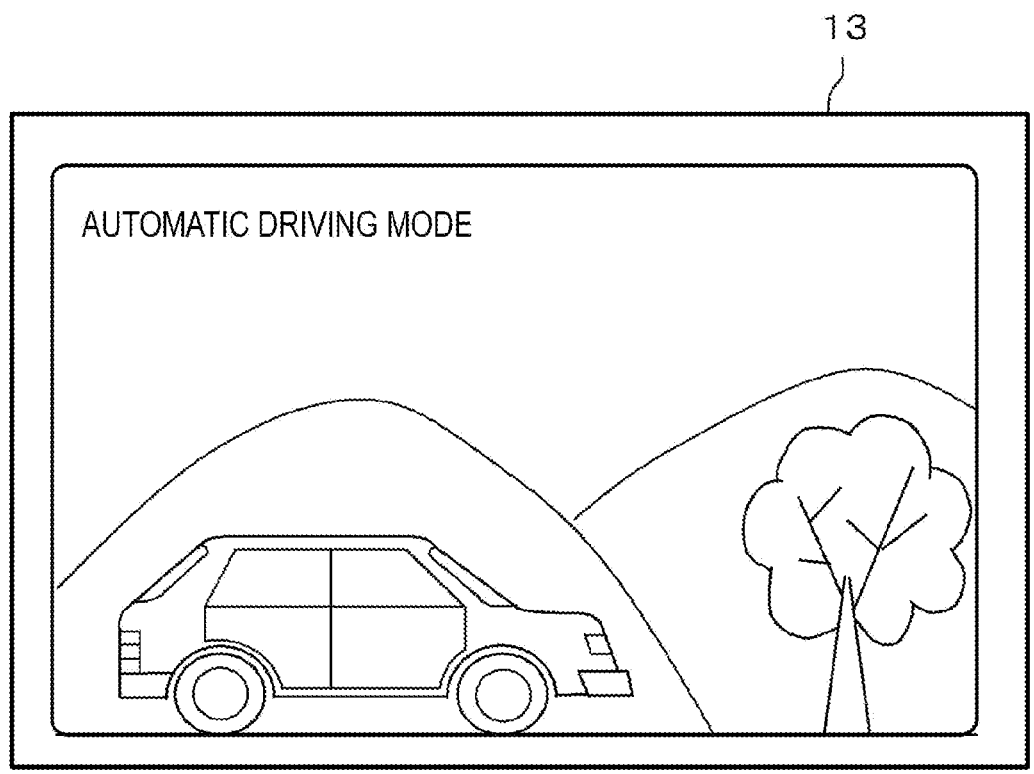
FIG. 3 is a diagram illustrating an exemplary display when the vehicle is travelling in the automatic driving mode.

In order to stop the route guidance by the processing unit 11 (S15: route guidance stop control unit), the audio guidance for route guidance stops being output from the speaker 16 (audio stop control unit) and the guidance display for route guidance (displaying travelling lane designation, right- or left-turn designation or straight designation) on the display unit 13 is stopped (display stop control unit). In this state, for example, a video based on the processing by the AV unit 17 can be displayed or the fact that the current driving mode is the "automatic driving mode" is displayed on the display unit 13 as illustrated in FIG. 3. Thereby, the driver can view the video contents displayed on the display unit 13 without performing a driving operation (steering wheel operation, accelerator operation or brake operation) while recognizing that the vehicle is travelling in the automatic driving mode.

Figure 4:
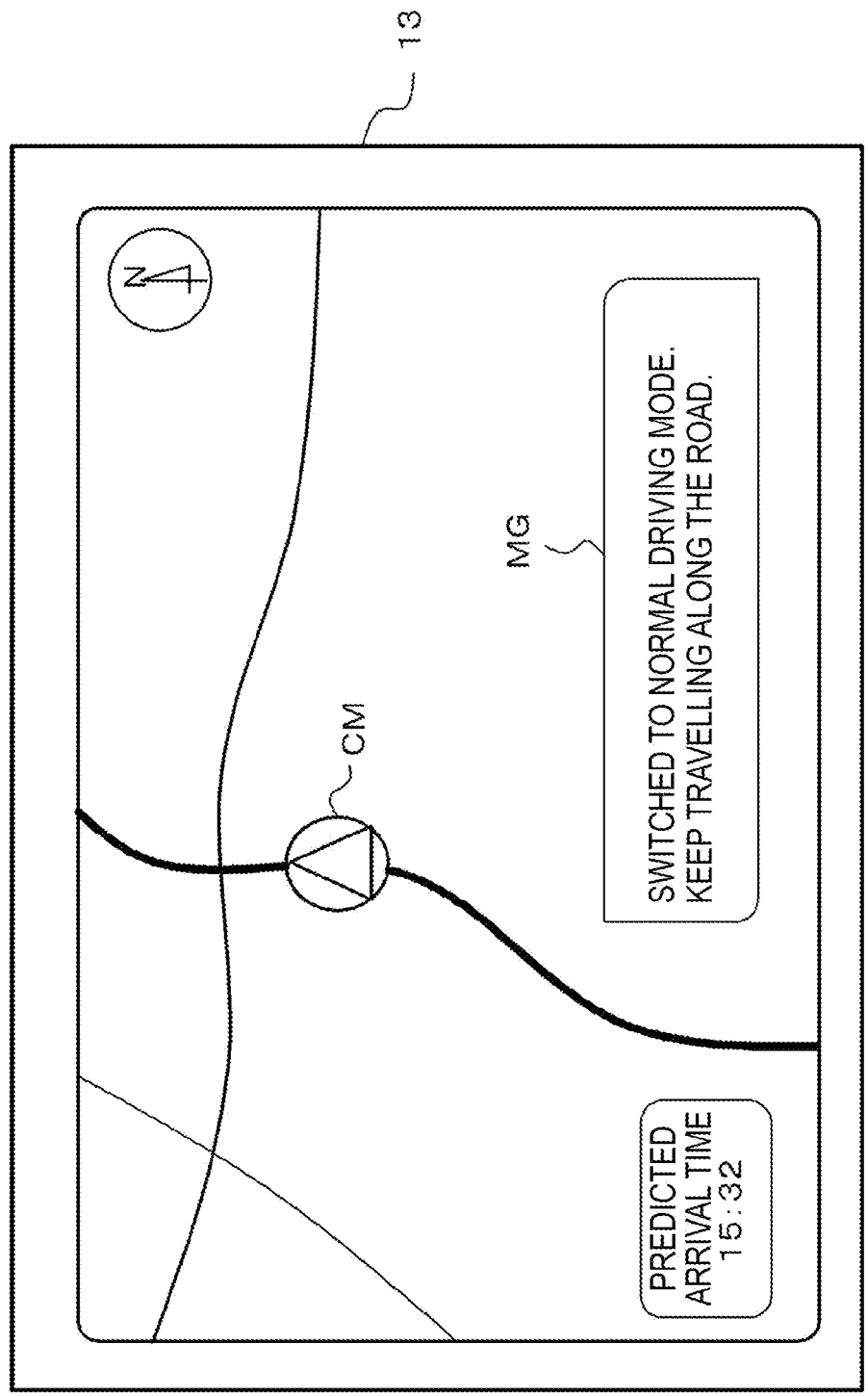
FIG. 4 is a diagram illustrating an exemplary display when the vehicle driving mode is switched from the automatic driving mode to the normal driving mode.

When the vehicle terminates traveling in the automatic driving mode along the automatic travelling road and the driving mode is switched to the normal driving mode in which the vehicle travels according to the driver's driving operations (YES in S11), the processing unit 11 judges that the switched driving mode is the normal driving mode (NO in S14: driving mode switching detection unit), displays (guidance display) a route guiding to the destination location (see a bold line) and a vehicle position mark CM together with a road map on the display unit 13 as illustrated in FIG. 4, for example, and further displays a message "switched to the normal driving mode" indicating that the driving mode is switched to the normal driving mode, and a message "travel along the road" for route guidance based on a vehicle travelling state when the driving mode is switched to the normal driving mode (on detecting the mode switching), such as a state in which the vehicle travels along a road relatively distant from an intersection to turn right or left (S16: on-switching route guidance control unit). At this time, the processing unit 11 outputs an audio guidance for the message that the driving mode is switched to the normal driving mode and the message for the route guidance from the speaker 16. While the vehicle is travelling at a predetermined distance from an intersection to turn right or left when the driving mode is switched to the normal driving mode (on detecting the mode switching), an audio guidance such as "turn left after . . . meters. Travel along the left lane", or corresponding guidance display is made based on the travelling state.

When the route guidance (see FIG. 4) based on the vehicle travelling state when the driving mode is switched to the normal driving mode is made, the processing unit 11 sets a state in which normal route guidance based on the navigation processing by the navigation unit 18 is made (S17). Thereafter, when the driving mode is not switched (NO in S11), the processing unit 11 judges that the predetermined end condition is not met (NO in S13), and keeps the current route guidance state, or a state in which the route guidance based on the navigation processing by the navigation unit 18 is made (S12). Thereby, the driver can perform a vehicle driving operation according to the route guidance.

While the driving mode is not switched (NO in S11) and the current route guidance state is kept (S12), when the predetermined end condition is met, for example, a route guidance end operation is performed (YES in S13), the processing unit 11 terminates the processing for controlling whether to make a route guidance.

With the navigation device (vehicle-mounted equipment 100) as described above, when the vehicle driving mode is determined to be the automatic driving mode, the route guidance (audio guidance, guidance display) made while the vehicle is travelling in the normal driving mode for travelling according to a driver's driving operations is stopped. Thus, when the vehicle travels in the automatic driving mode without the need of route guidance, a route guidance such as travelling lane designation, right- or left-turn designation and straight designation is not made, and the driver who does not need to perform any driving operation does not feel uncomfortable.

When the automatic driving mode is switched to the normal driving mode and the driver starts to perform a driving operation, a route guidance (audio guidance, guidance display: see FIG. 4) based on a vehicle travelling state when the driving mode is switched (on detecting the mode switching) is made. Thus, the driver can start a driving operation according to the route guidance without feeling uneasy immediately after the driving mode is switched to the normal driving mode. In the navigation device (vehicle-mounted equipment 100), when the vehicle driving mode is the automatic driving mode, only one of the audio guidance for route guidance and the guidance display for route guidance may be stopped.

Figure 5A:
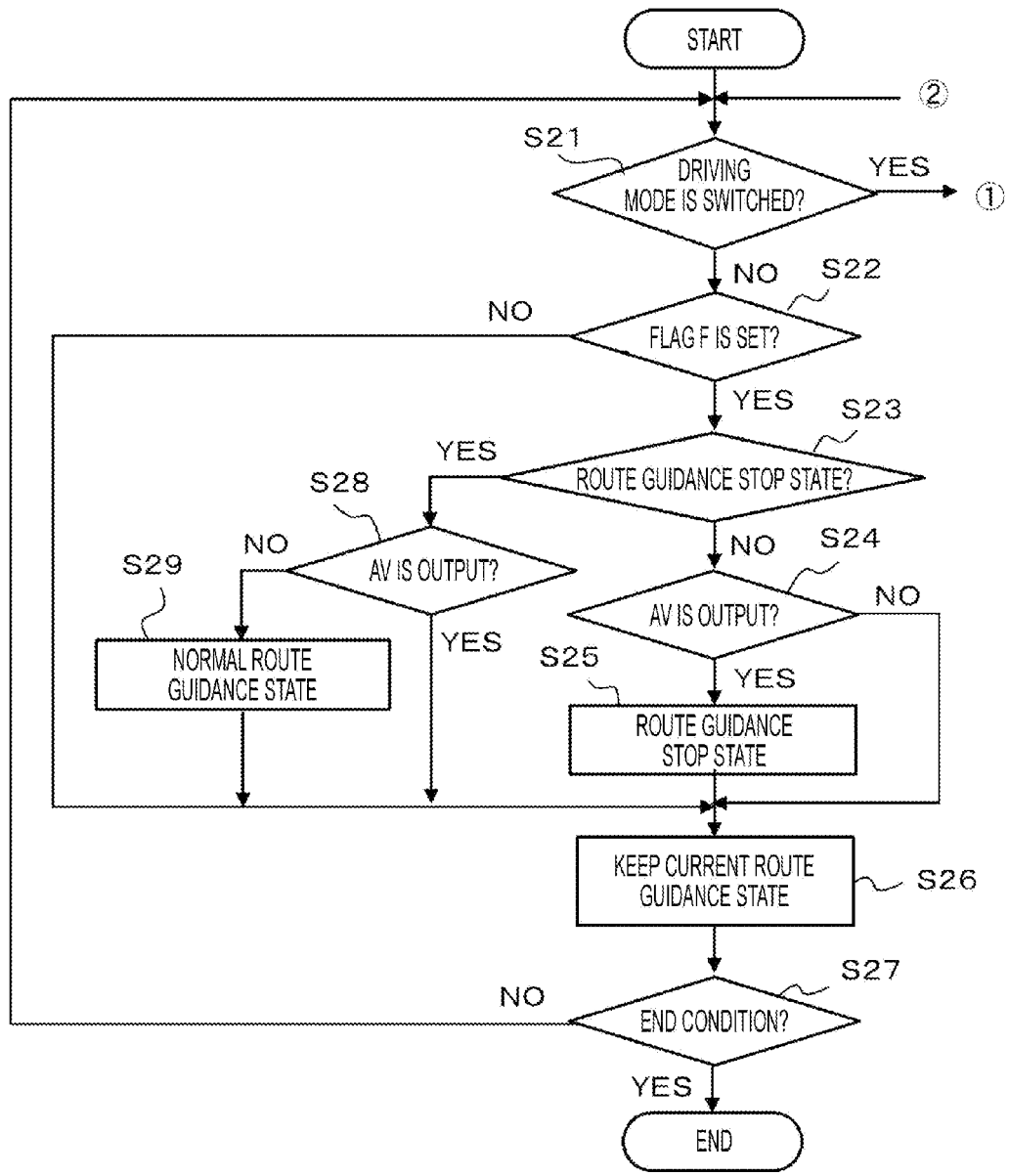
FIG. 5A is a flowchart illustrating another example (1) of the flow of processing for controlling the presence of an output route guidance based on the navigation processing.
Figure 5B:
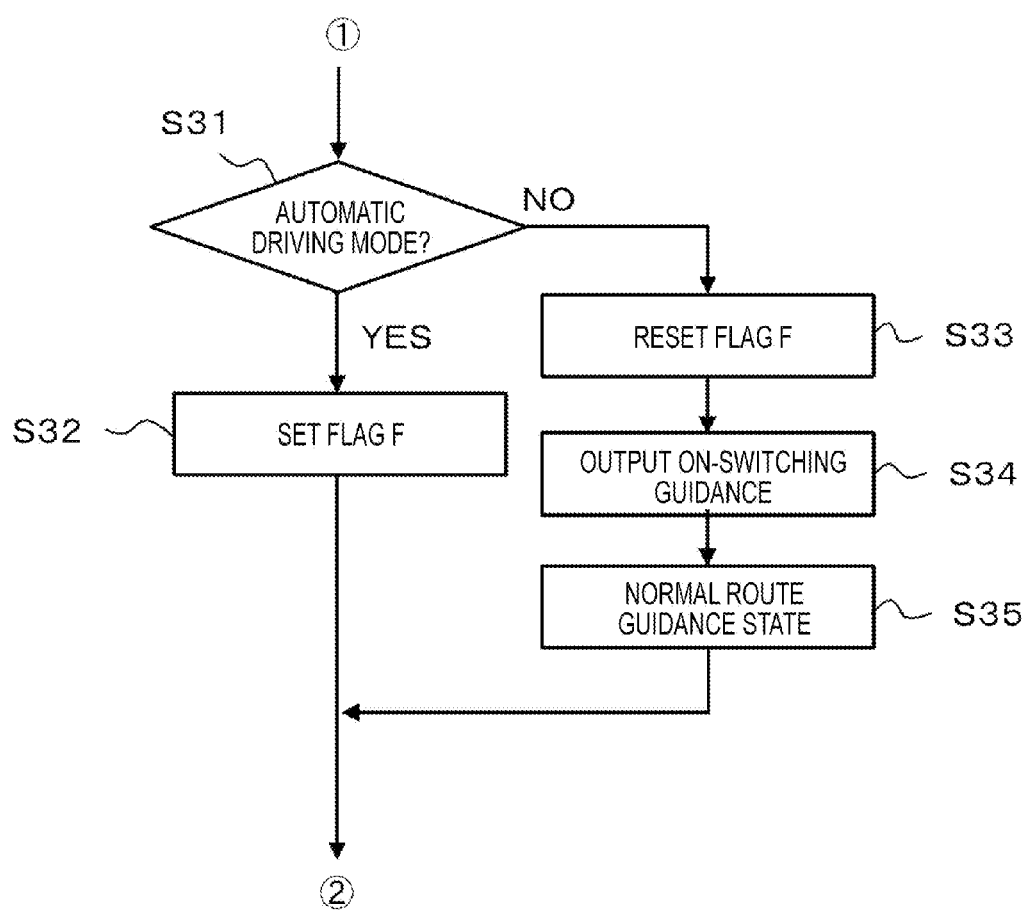
FIG. 5B is a flowchart of another example (2) of the flow of processing for controlling the presence of an output route guidance based on the navigation processing.

Then, the processing unit 11 can control whether to make route guidance based on the navigation processing according to the procedure illustrated in FIG. 5A and FIG. 5B instead of the procedure illustrated in FIG. 2. In the example, particularly while the vehicle travels in the automatic driving mode when video contents (audio/video contents) are output by the AV unit 17, the route guidance (audio guidance, guidance display) is stopped.

In FIG. 5A, when it is determined that the driving mode is switched (YES in S21), the processing unit 11 proceeds to the procedure illustrated in FIG. 5B and determines whether the switched driving mode is the automatic driving mode (S31: driving mode determination unit). When the switched driving mode is the automatic driving mode (YES in S31), the processing unit 11 sets an automatic driving flag F (S32). Then, after returning to the procedure of FIG. 5A, the processing unit 11 determines whether the automatic driving flag F is set (S22) while the driving mode is not switched (NO in S21), and when the automatic driving flag F is set (YES in S22), the processing unit 11 determines whether the route guidance is already stopped (S23). When the route guidance is not stopped (NO in S23), the processing unit 11 determines whether video contents (audio contents and video contents) are output based on the processing by the AV unit 17 other than the audio and guidance display for route guidance (S24: audio output determination unit, display output determination unit).

When video contents are not output while the vehicle is travelling in the automatic driving mode (NO in S24), the processing unit 11 keeps the current route guidance state, or a state in which the audio guidance for route guidance and guidance display based on the navigation processing by the navigation unit 18 are made (S26). Thereafter, the processing unit 11 confirms that the predetermined end condition is not met (NO in S27), the driving mode is not switched (NO in S21), the automatic driving flag F is set (YES in S22), the route guidance is not stopped (NO in S23), and video contents based on the processing by the AV unit 17 are not output (NO in S24), and keeps the current state in which the audio guidance for route guidance and guidance display based on the navigation processing are made. Thereby, the vehicle travels in the automatic driving mode while the audio guidance for route guidance and guidance display based on the navigation processing are made.

In the progress of the processing, when video contents based on the processing by the AV unit 17 are displayed on the display unit 13 and their audio is output from the speaker 16 by a driver's operation on the operation unit 12 (YES in S24), the processing unit 11 stops the route guidance (guidance display, audio guidance) based on the navigation processing (S25). Thereafter, the processing unit 11 judges that the predetermined end condition is not met (NO in S27), the driving mode is not switched (NO in S21), the automatic driving flag F is set (YES in S22), the route guidance is already stopped (YES in S23) and video contents based on the processing by the AV unit 17 are output (YES in S28), and keeps the current state in which the route guidance is stopped (S26). Thereby, in the vehicle travelling in the automatic driving mode, a guidance image for route guidance is not interrupting the video contents displayed on the display unit 13 and an audio guidance for route guidance is not interrupting the audio for video contents output from the speaker 16. Thus, the driver who does not need to perform any driving operation on the vehicle travelling in the automatic driving mode can view video contents without being disturbed by the route guidance.

In the progress of the processing (S26, NO in S27, NO in S21, YES in S22, YES in S23, and YES in S28), when the driver operates the operation unit 12 thereby to stop outputting video contents (NO in S28), the processing unit 11 sets a state in which route guidance (audio guidance, guidance display) based on the navigation processing by the navigation unit 18 is made (S29). Thereafter, as described above, the processing unit 11 judges that the predetermined end condition is not met (NO in S27), the driving mode is not switched (NO in S21), the automatic driving flag F is set (YES in S22), the route guidance is not stopped (NO in S23), and video contents based on the processing by the AV unit 17 are not output (NO in S24), and keeps the current state in which the audio guidance for route guidance and guidance display are made (S26). Thereby, when the video contents based on the processing by the AV unit 17 stop being output, an audio guidance for route guidance and guidance display based on the navigation processing are made again.

Further, when the driving mode is switched from the automatic driving mode to the normal driving mode (YES in S21, NO in S31 in FIG. 5B), the processing unit 11 resets the automatic driving flag F (S33) in the procedure illustrated in FIG. 5B, and then displays (guidance display) a route (e.g., a bold line) to be guided to the destination location and a vehicle position mark CM together with a road map on the display unit 13 as illustrated in FIG. 4, for example, similar to the above example (see FIG. 2), further displays a message that the driving mode is switched to the normal driving mode and a message for route guidance based on a vehicle travelling state when the driving mode is switched to the normal driving mode (on detecting the mode switching), and outputs an audio guidance for the message that the driving mode is switched to the normal driving mode and the message for route guidance from the speaker 16 (S34: on-switching route guidance control unit). Then, the processing unit 11 sets a state in which normal route guidance based on the navigation processing by the navigation unit 18 is made (S35). Thereafter, the processing unit 11 returns to the procedure illustrated in FIG. 5A, confirms that the driving mode is not switched (NO in S21), the automatic driving flag F is not set (NO in S22), and the predetermined end condition is not met (NO in S27), and keeps the current route guidance state, or a state in which the route guidance is made based on the navigation processing by the navigation unit 18 (S26). Thereby, the driver can perform a vehicle driving operation according to the route guidance (audio guidance, guidance display).

In the progress of the processing, when the predetermined end operation is performed (YES in S27), the processing unit 11 terminates the processing for controlling whether to make a route guidance.

In the example (see FIG. 5A and FIG. 5B), when the vehicle travels in the automatic driving mode while video contents are being output, only one of the audio guidance for route guidance and the guidance display for route guidance may be stopped (S25).

The navigation device according to the present disclosure has an effect that route guidance is not output while the vehicle is travelling in the automatic driving mode, and is useful as a navigation device mounted in a vehicle travelling in any driving mode out of the automatic driving mode for travelling irrespective of a driver's driving operation and the normal driving mode for travelling according to the driver's driving operations.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A navigation device mounted in a vehicle travelling in any driving mode out of an automatic driving mode for travelling irrespective of a driver's driving operations and a normal driving mode for travelling according to the driver's driving operations, comprising:
    a driving mode determination unit configured to determine whether a driving mode of the vehicle is the automatic driving mode or the normal driving mode; and
    a route guidance stop control unit configured to, when the driving mode determination unit determines that a driving mode of the vehicle is the automatic driving mode, stop route guidance made while the vehicle is travelling in the normal driving mode.

2. The navigation device according to claim 1,
    wherein the route guidance stop control unit includes a display stop control unit configured to stop guidance display for route guidance made on a display unit while the vehicle is travelling in the normal driving mode.

3. The navigation device according to claim 1,
    wherein the route guidance stop control unit includes an audio stop control unit configured to stop outputting from an audio output unit an audio guidance for route guidance made while the vehicle is travelling in the normal driving mode.

4. The navigation device according to claim 3,
    wherein the route guidance stop control unit includes a display stop control unit configured to stop guidance display for route guidance made on the display unit while the vehicle is travelling in the normal driving mode.

5. The navigation device according to claim 3,
    wherein the audio stop control unit includes an audio output determination unit configured to determine whether audio other than the voice for route guidance is output from the audio output unit, and
    when the audio output determination unit determines that audio other than the voice for route guidance is output from the audio output unit, the audio guidance is not output from the audio output unit.

6. The navigation device according to claim 5,
    wherein the route guidance stop control unit includes a display stop control unit configured to stop guidance display for route guidance made on the display unit while the vehicle is travelling in the normal driving mode.

7. The navigation device according to claim 6,
    wherein the display stop control unit includes a display output determination unit configured to determine whether video contents other than the guidance display for route guidance are displayed on the display unit, and
    when the display output determination unit determines that video contents other than the guidance display are displayed on the display unit, the guidance display is not output on the display unit.

8. The navigation device according to claim 7, comprising:
    a driving mode switching detection unit configured to detect that the driving mode is switched from the automatic driving mode to the normal driving mode; and
    an on-switching route guidance control unit configured to, when the driving mode switching detection unit detects that the driving mode is switched from the automatic driving mode to the normal driving mode, provide route guidance based on a travelling state of the vehicle on detection of the driving mode switching.

9. The navigation device according to claim 8,
    wherein the on-switching route guidance control unit performs guidance display for route guidance based on a travelling state of the vehicle on detection of the driving mode switching on the display unit.

10. The navigation device according to claim 8,
    wherein the on-switching route guidance control unit outputs audio guidance for route guidance based on a travelling state of the vehicle on detection of the driving mode switching from the audio output unit.

11. The navigation device according to claim 10,
    wherein the on-switching route guidance control unit performs guidance display for route guidance based on a travelling state of the vehicle on detection of the driving mode switching on the display unit.

12. A route guidance control method in a navigation device mounted in a vehicle travelling in any driving mode out of an automatic driving mode for travelling irrespective of a driver's driving operations and a normal driving mode for traveling according to the driver's driving operations, comprising:

a driving mode determination process of determining whether a driving mode of the vehicle is the automatic driving mode or the normal driving mode; and a route guidance stop control process of, when a driving mode of the vehicle is determined as the automatic driving mode in the driving mode determination process, stopping route guidance made while the vehicle is travelling in the normal driving mode.

13. The route guidance control method according to claim 12, wherein the route guidance stop control process includes at least one of a display stop control process to stop guidance display for route guidance made on a display unit and an audio stop control process to stop outputting from an audio output unit an audio guidance for route guidance.

14. The route guidance control method according to claim 13, wherein the audio stop control process determines whether audio other than a voice for route guidance is output from the audio output unit, and when it is determined that audio other than the voice for route guidance is output from the audio output unit, the audio guidance is not output from the audio output unit.

15. The route guidance control method according to claim 13, wherein the display stop control process determines whether video contents other than a guidance display for route guidance are displayed on the display unit, and when it is determined that video contents other than the guidance display are displayed on the display unit, the guidance display is not output on the display unit.

16. The route guidance control method according to claim 15, comprising:

a driving mode switching detection process configured to detect that the driving mode is switched from the automatic driving mode to the normal driving mode; and an on-switching route guidance control process configured to, when the driving mode switching detection process detects that the driving mode is switched from the automatic driving mode to the normal driving mode, provide route guidance based on a travelling state of the vehicle on detection of the driving mode switching.

17. A non-transitory computer-readable storage medium storing therein a program for causing a computer to perform processing in a navigation device mounted in a vehicle travelling in any driving mode out of an automatic driving mode for travelling irrespective of a driver's driving operations and a normal driving mode for travelling according to the driver's driving operations, the program causing the computer to perform:

a driving mode determination process of determining whether a driving mode of the vehicle is the automatic driving mode or the normal driving mode; and a route guidance stop control process of, when a driving mode of the vehicle is determined as the automatic driving mode in the driving mode determination process, stopping route guidance made while the vehicle is travelling in the normal driving mode.

18. The computer-readable storage medium according to claim 17, wherein the route guidance stop control process includes at least one of a display stop control process to stop guidance display for route guidance made on a display unit and an audio stop control process to stop outputting from an audio output unit an audio guidance for route guidance.

19. The computer-readable storage medium according to claim 18, wherein the audio stop control process determines whether audio other than a voice for route guidance is output from the audio output unit, and when it is determined that audio other than the voice for route guidance is output from the audio output unit, the audio guidance is not output from the audio output unit.

20. The computer-readable storage medium according to claim 18, wherein the display stop control process determines whether video contents other than a guidance display for route guidance are displayed on the display unit, and when it is determined that video contents other than the guidance display are displayed on the display unit, the guidance display is not output on the display unit.

* * * * *